May 21, 1929.  J. H. WILSON  1,713,634
LUBRICATION OF SEALED MECHANISM
Filed Nov. 16, 1925  2 Sheets-Sheet 1

Inventor
James Henry Wilson
Per. J. Hatcher Wilson
Attorney.

May 21, 1929. J. H. WILSON 1,713,634
LUBRICATION OF SEALED MECHANISM
Filed Nov. 16, 1925 2 Sheets-Sheet 2

Inventor
James Henry Wilson
Per.. Y. Fletcher Wilson
Attorney.

Patented May 21, 1929.

1,713,634

UNITED STATES PATENT OFFICE.

JAMES HENRY WILSON, OF BAGINTON, NEAR COVENTRY, ENGLAND.

LUBRICATION OF SEALED MECHANISM.

Application filed November 16, 1925, Serial No. 69,398, and in Great Britain July 4, 1925.

This invention is applicable in all cases where mechanism is enclosed within a casing which after assembly is permanently closed in a fluid-tight manner. In such cases, when the initial supply of lubricant to the various working parts of the enclosed mechanism is exhausted replenishment in the ordinary way is quite impossible with the result that the working parts rapidly become worn.

In the case of gas meters, for example, it is especially necessary to avoid such wear or even dryness of the working parts, such as stuffing boxes, valves and the diaphragm, otherwise leakage of gas will ensue with consequent variations in measurement. The need for some provision for enabling the working parts to be lubricated from time to time is important in the case of gas meters because the gas, especially when it is water gas or enriched by benzol or the like, has a searching and deleterious effect on the lubricant and on the diaphragm which becomes dry and eventually cracks.

The object of the present invention is to provide for lubrication of the enclosed mechanism as and when required notwithstanding the fact of its being permanently enclosed and to all intents and purposes inaccessible.

According to this invention the lubrication of the several working parts of the mechanism is positive and individual, each enclosed part being supplied with lubricant direct from the outside of the casing. For this purpose the casing is fitted with one or more nipples which protrude through the wall thereof and are firmly secured in position therein by soldering or in any other suitable manner. The outer end of each nipple is adapted for the reception of the delivery end of grease or oil under pressure. The inner end of each nipple is connected by one or more metal pipes direct to one or more stuffing boxes, bearings or the like working parts of the enclosed mechanism.

In order that the invention may be clearly understood and readily carried into practical effect in other cases I will describe the same as applied by way of example to a gas meter, reference being made to the accompanying drawings, wherein, Figure 1 is a plan view of a conventional type of gas meter prior to enclosure, showing the application thereto of the present invention.

Throughout the drawings like parts are designated by similar reference characters.

Figure 1:
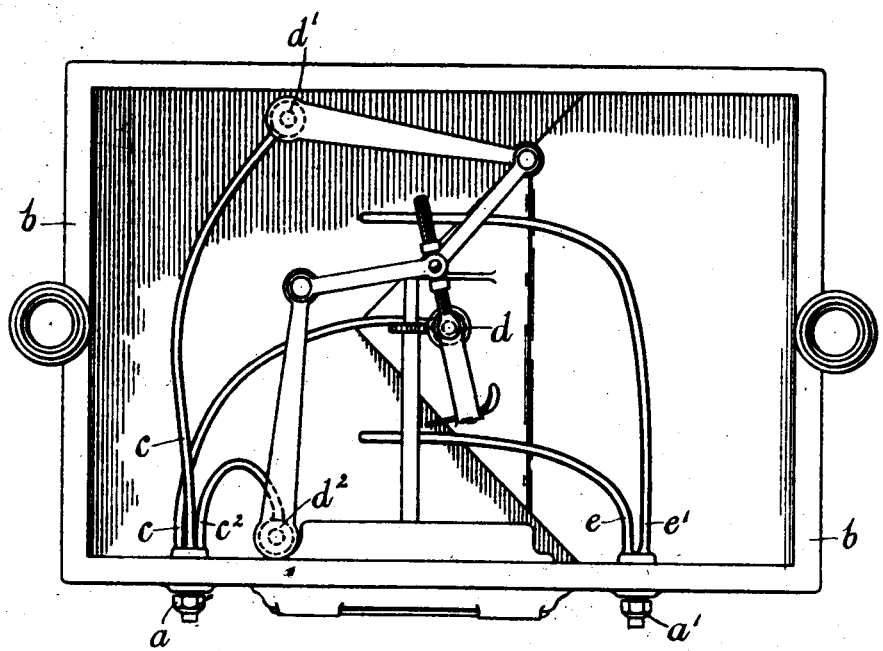
Figure 2:
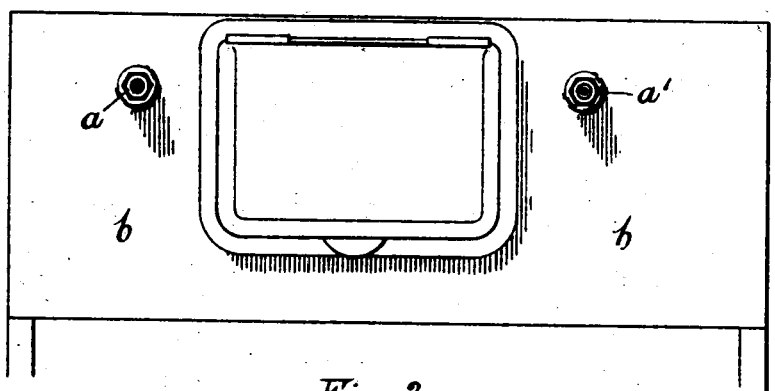
Figure 2 is an outside elevation of the upper front portion of the same.
Figure 3:
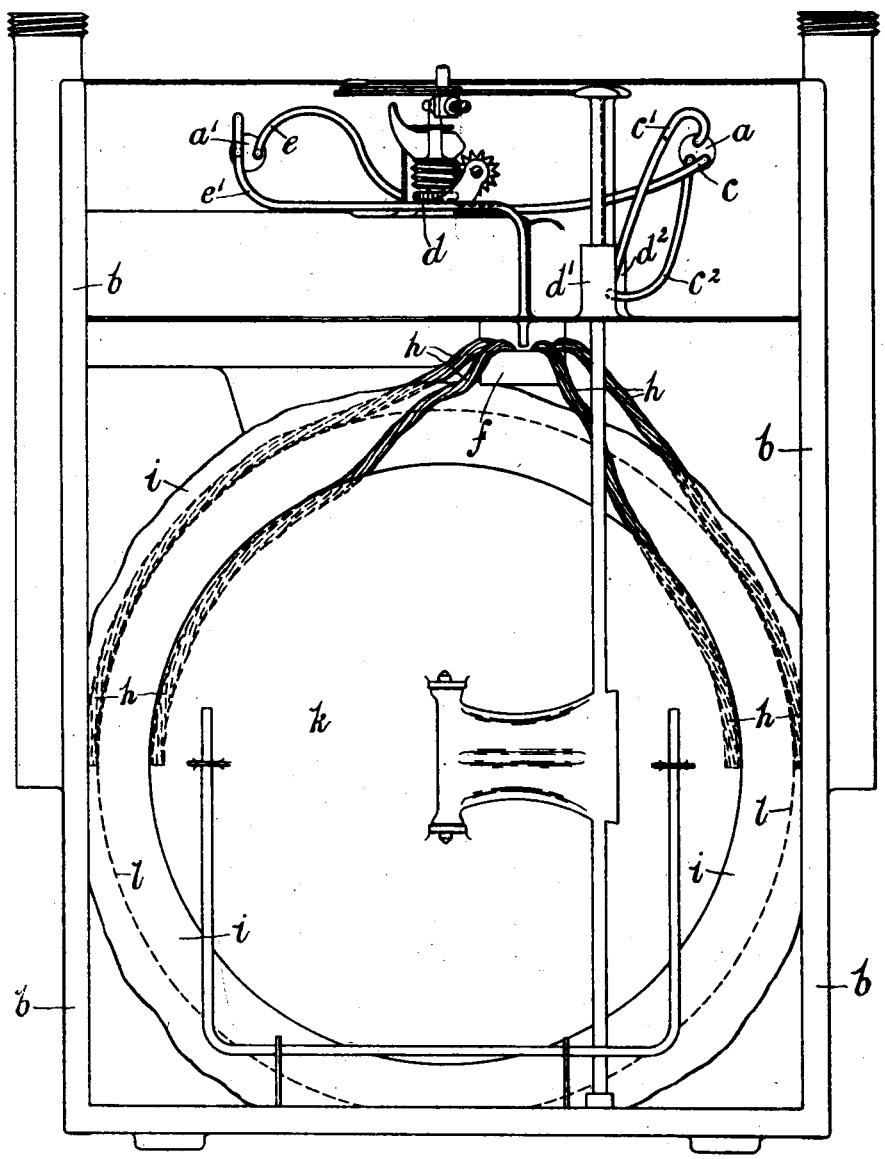
Figure 3 is a rear view of the meter with the back plate removed to disclose the manner in which the diaphragm is lubricated.

Referring to the drawings, $a$, $a^1$ represent nipples secured in and protruding through the upper front wall of the casing $b$ of the meter. The nipple $a$ the outer end of which is adapted for the reception of grease under pressure, as by means of a grease gun or grease cap is connected at its inner end by means of metal pipes $c$, $c^1$ and $c^2$ of small bore direct with each of the usual stuffing boxes $d$, $d^1$ $d^2$ for the spindles of the valve and diaphragm respectively.

The nipple $a^1$ the outer end of which is adapted for the reception of oil under pressure, as by means of an oil pump, is provided at its inner end with metal pipes $e$, $e^1$ of small bore which pass through the base of the upper compartment of the meter and deliver oil into trays or receptacles $f$ provided for the purpose in the upper part of the lower compartment of the meter. If desired there may be a separate nipple for each tray and in any case such oil nipple or nipples may be provided with a non-return valve to prevent any escape of oil or gas.

From each tray wicks $h$ are led around the diaphragm $i$ where the same is connected with the end plate $k$ and with the central partition $l$ at each side of the latter. In this way the leather of the diaphragm is maintained in a flexible and pliable state at those parts which are prone to become dry and to crack.

By means of this invention it will be seen that the useful life of the mechanism can be appreciably prolonged and its action at all times maintained uniform in so far as such uniformity depends upon fluid-tight joints and adequate lubrication of all working parts.

It is to be understood that the pipes $c$, $c^1$, $c^2$ $e$ and $e^1$ connecting the nipples with the stuffing boxes and oil trays are strong enough to resist high internal pressures and that they are permanent fixtures and entirely enclosed when the casing is finally sealed.

The invention is equally applicable to dry and wet meters, it making no difference whether the stuffing boxes and bearings work under water or not.

I claim:—

1. In combination, a gas meter having a bellows chamber, valve and registering mechanism operated therefrom, nipples protruding through the walls of the meter casing, a set of pipes permanently secured to the inner end of each nipple, one of said sets of pipes being adapted to convey grease under pressure direct to the bearings and stuffing boxes of said mechanism, and another set of said pipes being adapted to convey oil under pressure for use in said bellows chamber.

2. In combination, a gas meter having a bellows chamber, valve and registering mechanism operated therefrom, nipples protruding through the walls of the meter casing, an oil tray located in said bellows chamber, a set of pipes permanently secured to the inner ends of each nipple, one of said sets of pipes being adapted to convey grease under pressure direct to the bearings and stuffing boxes of said mechanism, another of said sets of pipes being adapted to convey oil under pressure to said tray, and wicks conveying oil from said trap to the bellows leathers.

JAMES HENRY WILSON.